US009552347B1

(12) United States Patent
Terasawa

(10) Patent No.: US 9,552,347 B1
(45) Date of Patent: Jan. 24, 2017

(54) DATA GRID CELL STYLING SYSTEMS AND METHODS

(71) Applicant: CA, Inc., Islandia, NY (US)

(72) Inventor: Kiyoshi Terasawa, Novato, CA (US)

(73) Assignee: CA, Inc., Islandia, NY (US)

( * ) Notice: Subject to any disclaimer, the term of this patent is extended or adjusted under 35 U.S.C. 154(b) by 368 days.

(21) Appl. No.: 13/777,312

(22) Filed: Feb. 26, 2013

(51) Int. Cl.
*G06F 17/00* (2006.01)
*G06F 17/24* (2006.01)

(52) U.S. Cl.
CPC ................................ *G06F 17/246* (2013.01)

(58) Field of Classification Search
CPC .................................................. G06F 17/227
USPC ........................................................ 715/212
See application file for complete search history.

(56) References Cited

U.S. PATENT DOCUMENTS

| | | | |
|---|---|---|---|
| 6,199,082 B1* | 3/2001 | Ferrel | G06F 17/3089 |
| | | | 707/E17.005 |
| 6,990,480 B1* | 1/2006 | Burt | G06F 17/246 |
| 7,577,938 B2* | 8/2009 | Bent et al. | 717/113 |
| 8,327,259 B2* | 12/2012 | Berger | G06F 17/245 |
| | | | 715/227 |
| 9,208,213 B2* | 12/2015 | Harold | G06F 17/30557 |
| 2003/0071840 A1* | 4/2003 | Huang | H04L 41/22 |
| | | | 715/736 |
| 2005/0289450 A1* | 12/2005 | Bent | G06F 17/30554 |
| | | | 715/221 |
| 2007/0162844 A1* | 7/2007 | Woodall | G06F 17/245 |
| | | | 715/209 |
| 2007/0271523 A1* | 11/2007 | Lacey | G06F 8/38 |
| | | | 715/762 |
| 2008/0028288 A1* | 1/2008 | Vayssiere | G06F 17/246 |
| | | | 715/219 |
| 2009/0119578 A1* | 5/2009 | Relyea | G06F 9/4443 |
| | | | 715/234 |
| 2009/0254572 A1* | 10/2009 | Redlich | G06Q 10/06 |
| 2010/0070924 A1* | 3/2010 | Hart, II | G06F 9/4443 |
| | | | 715/829 |
| 2010/0169758 A1* | 7/2010 | Thomsen | G06F 17/246 |
| | | | 715/212 |
| 2011/0113334 A1* | 5/2011 | Joy | G06F 17/30056 |
| | | | 715/716 |
| 2011/0219321 A1* | 9/2011 | Gonzalez Veron | G06F 3/048 |
| | | | 715/764 |
| 2011/0296298 A1* | 12/2011 | Ahuja | G06F 17/30893 |
| | | | 715/248 |

OTHER PUBLICATIONS

Haas, Ellen C., et al, "Temporal Binding of Multimodal Controls for Dynamic Map Displays: A Systems Approach", ICMI '11: Proceedings of the 13th International Conference on Multimodal Interfaces, Nov. 2011, pp. 409-415.*

* cited by examiner

*Primary Examiner* — Laurie Ries
(74) *Attorney, Agent, or Firm* — Gilliam IP PLLC

(57) ABSTRACT

Generally discussed herein are systems and methods for data grid cell styling. A method can include defining a data structure for a data grid, inserting a data column from a column in the data grid into the data structure, defining a style column in the data structure corresponding to the inserted data column, and associating the data structure to a control for the data grid such that the data structure is bound to the control when the control is rendered, without modifying the control.

24 Claims, 5 Drawing Sheets

| MyData | MyData_Style | MyData_Style_DSP |
|---|---|---|
| Black | Style_Black | Style_Black_DSP |
| Red | Style_Black | Style_Black_DSP |
| Blue | Style_Black | Style_Black_DSP |

DATA GRID CELL STYLING SYSTEMS AND METHODS

BACKGROUND

A data grid can utilize controls that facilitate automated generation of columns and rows in a document. The controls can be used to format objects added to a column depending on the public properties of the object. Examples include textbox columns for string values, checkbox columns for Boolean values, combobox columns for enumerable values, and hyperlink columns for uniform resource indicator (URI) values.

In addition to automatic generation of columns, the controls can include a header control, display control, and edit control. Further functions include grouping, sorting, reorganizing, resizing, row details, alternating backgrounds, frozen columns, header visibility, and other functions. To perform these functions, the control can be retrieved and rendered when displaying and editing data in the data grid.

BRIEF SUMMARY

A method can include defining a data structure for a data grid, inserting a data column from a column in the data grid into the data structure, defining a style object to control an appearance of a cell of the data grid, defining a style column included in the data structure corresponding to the inserted data column, and associating the data structure to a control for the data grid such that the data structure is bound to the style object when the control is rendered, without modifying the control.

A system can include a data structure stored on a computer readable storage device, the data structure having a data string column and a style name column. The system includes a binder and converter running on a processor to associate a data control with a style object in the style name column and to bind a cell control to the data structure such that a data grid is displayed with the data string and associated style defined by the style object.

A computer program product can include a computer readable storage medium a computer readable storage medium having computer readable program code embodied therewith, the computer program code including computer readable program code configured to define a data structure for a data grid, insert a data column from a column in the data grid into the data structure, and define a style object to control an appearance of a cell of the data grid. The computer program product can further include program code configured to define a style column in the data structure corresponding to the inserted data column, and associate the data structure to a control for the data grid such that the data structure is bound to the style object when the control is rendered, without modifying the control.

BRIEF DESCRIPTION OF THE DRAWINGS

Aspects of the present disclosure are illustrated by way of example and are not limited by the accompanying figures with like references indicating like elements.

DETAILED DESCRIPTION

Figures 1, 2, 3:
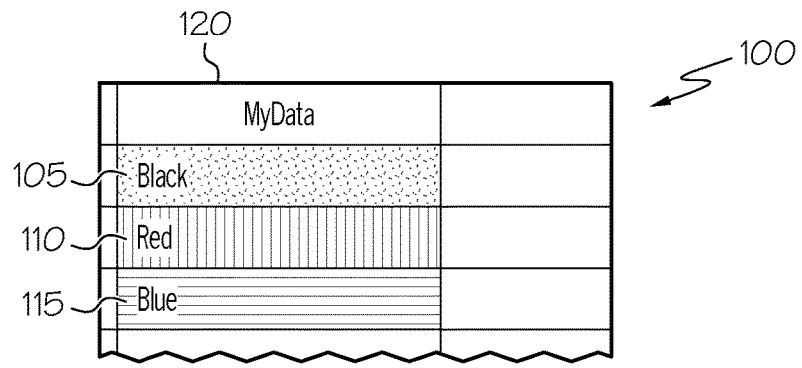
FIG. 1 is a display of a data grid according to an example embodiment.
FIG. 2 is a representation of data in memory corresponding to the data grid of FIG. 1
FIG. 3 is a representation of the data in memory of FIG. 2 with an updated style key name according to an example embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In various embodiments, a Windows Presentation Foundation (WPF) data grid cell property may be modifiable by simply updating data values in an associated memory database. The memory may be bound to a data grid control cell style. The modification may be made without retrieving the actual cell control rendered in the data grid to apply a style. A programmer may update the data to change the cell style object as opposed to using a control. The style object can define how the cell or one or more characters in the cell appears when a corresponding control is rendered. No control logic modification is needed to load a current cell from the data grid rows. At runtime, the data grid may use memory data values to generate a display of a data grid based on render controls per cell as defined in memory.

FIG. 1 shows an example data grid 100 as displayed to a user. The data grid 100 includes text (e.g., a list of colors) in a column of cells. Three rows of text identifying colors are shown, black at 105, red at 110, and blue at 115. A column header 120 is labeled "MyData". Each row also has a background of the same color as the text in the row. The data grid, in one or more embodiments, may be automatically generated using a WPF DataGrid cell control. While colors are used in this example, other attributes for a cell may be used in further embodiments, such as bold, blinking, italic, size, font, etc.

FIG. 2 illustrates data in memory 200. A converter may be created to convert a string (e.g., a text or other data string) to a style name or a style object. The converter's style object can be bound to a control of the data grid at control rendering. Using the style object, design and content or logic can be segregated. A first column 205 can include the header "MyData" and the text or actual data, black, red, and blue. A second column 210 can be created to include a style for each row, and can be labeled "MyData_Style". A third column 215 can be created that identifies a display style, and can be labeled "MyData_Style_DSP". The converter can provide easy access to backend data through a property that points to where the data is stored. For example, the backend data can be accessible through an "ItemSource" property. Backend data can include the "Style" and "Style_DSP" data. All rows, a selected row or a list of rows may be accessed based on a data value. Specific columns may also be accessed. The data in the cells may be updated without utilizing the controls. One column may be used for display control, and one may be used for the edit control. All items in the data grid or the data structure can be linked together in a database.

FIG. 3 illustrates the data in memory 300 that includes style key names. In column 210, the styles include "Style_Black", "Style_Red", and "Style_Blue". In one or more embodiments, MyData_Style is the style key name of MyData edit mode style. Column 215 now includes the display style or background for each cell in which the text is displayed, including "Style_Black_DSP", "Style_Red_DSP", and "Style_Blue_DSP". MyData_Style_DSP is the style key name of MyData display mode style. The columns 210 and 215 may not be visible to a user when the data grid is being displayed, but the results of the styles can be visible when the corresponding cell control is rendered.

When the cell control is rendered, binding between cell control and the corresponding Style key name column are made. At a low level, a converter can convert a style class and a string and the binding can be between a style class and a control. The following is an example of a style definition for the black cell:

<Style x:Key="Style_Black_DSP">
<Setter Property="TextAlignment" Value="Left"/>
<Setter Property="Visibility" Value="Visible"/>
<Setter Property="IsEnabled" Value="True"/>
<Setter Property="Background" Value="#000000"/>
<Setter Property="Foreground" Value="#FFFFFF"/>
<Setter Property="IsTabStop" Value="True"/>
</Style>

The following is a style definition for the red cell:
<Style x:Key="Style_Red_DSP">
<Setter Property="TextAlignment" Value="Left"/>
<Setter Property="Visibility" Value="Visible"/>
<Setter Property="IsEnabled" Value="True"/>
<Setter Property="Background" Value="#FF0000"/>

```
<Setter Property="Foreground" Value="#FFFFFF"/>
<Setter Property="IsTabStop" Value="True"/>
</Style>
```

The following is a style definition for the blue cell:
```
<Style x:Key="Style_Blue_DSP">
<Setter Property="TextAlignment" Value="Left"/>
<Setter Property="Visibility" Value="Visible"/>
<Setter Property="IsEnabled" Value="True"/>
<Setter Property="Background" Value="#0000FF"/>
<Setter Property="Foreground" Value="#FFFF00"/>
<Setter Property="IsTabStop" Value="True"/>
</Style>
```

After data is added to the memory database, the name of style is also updated to correspond to a specific column in specific row. As a result, the cell control is rendered with specific style properties as shown in FIG. 1 at 100.

By adding column level style key name property to a data grid control, a user can pre-set a style key name and newly inserted data (e.g., data in a row) can use the style key name as a default Style. In one or more embodiments, the style for each row may be set without using the default style or it may be changed from the default style after it is set.

In the following example data grid, the background in all cells is set to Black as shown at 400 in FIG. 4. A column of data 405 has a header of MyData. Text boxes 410, 415, 420 beneath the header include the text "Black", "Red", and "Blue", respectively, and include a background style that is defined to be black (see FIG. 5).

Figures 4, 5:
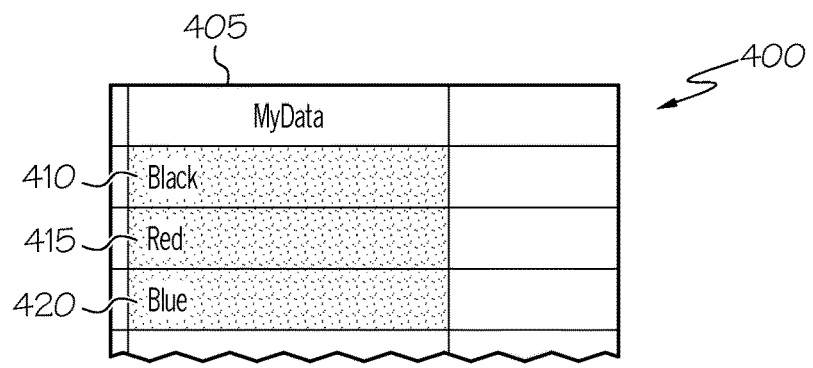
FIG. 4 is a display of a data grid utilizing an updated style in data in memory according to an example embodiment.
FIG. 5 is a representation of data in memory corresponding to the data grid of FIG. 4.

The data in memory for the data grid 400 is shown at 500 in FIG. 5. The column 205 contains the header "MyData" and the text in the cells of the rows underneath the header. In column 510, the styles include "Style_Black", "Style_Black", and "Style_Black". In one or more embodiments, MyData_Style is the style key name of MyData edit mode style. A column 515 includes the display style or background for each cell in which the text is displayed, including "Style_Black_DSP", "Style_Black_DSP", and "Style_Black_DSP". MyData_Style_DSP is the style key name of MyData display mode style. The two columns 510 and 515 are not visible to a user when the column of data 405 is being displayed, but the results of the styles are visible. As seen, a user can set the style key name against MyData Column definition as Style_Black and Style_Black_DSP. The data can be held outside of the data grid memory database, such as on a per column basis.

Figure 6:
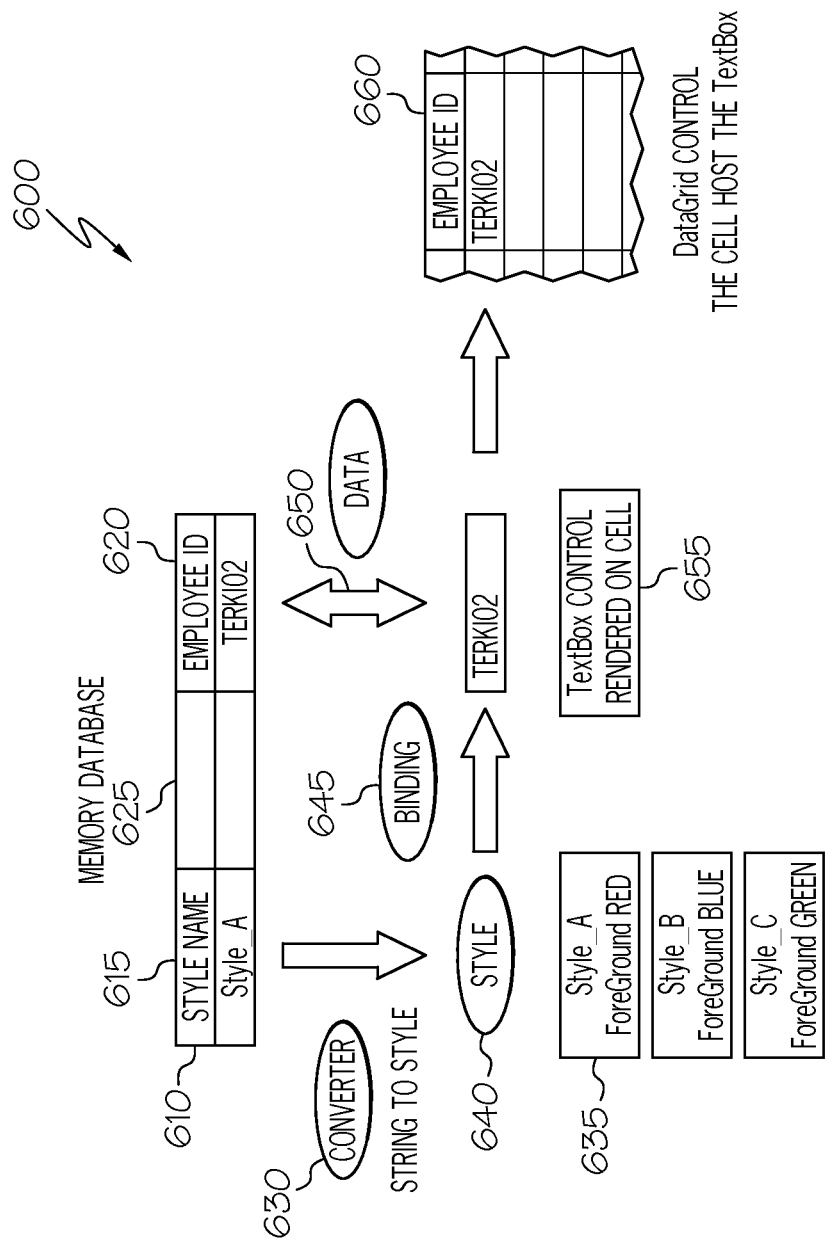
FIG. 6 is a block flow diagram illustrating a memory data base used to update styles in a data grid without modifying a data grid control according to an example embodiment.

FIG. 6 is a block flow diagram that illustrates a method 600 of updating a style object for a data grid text box. A memory database is shown at 610 having a style name column 615 and an employee ID column 620. A style column 625 is currently empty. A converter 630 can be used to provide style values 635 as indicated at 640 for the style column 625 to be used. Binding 645 can use the employee ID data at 650 and can associate or bind the style class of the received string (e.g., text or other data) with a style value 635 by associating the style class with a control's style, such as the style property of text box control 655. The associated style value 635, in this example specifies red foreground. The text box control 655 can be rendered by a data grid control to display an edit box 660. By changing the style name column 615 value, the style object for the textbox on the cell can be updated. Thus, allowing a user to change the style of rendered data from the default style without accessing the corresponding control. The converter 630 and binding 645 can be associated to each other when the cell renders the edit box 660. Thus, the data structure can be associated with a control for the data grid. The data structure is bound to the style object when the control is rendered, without modifying the control.

In one embodiment, the column level initial style names per column may be held outside of the actual database. The style names may be used when adding a new row to the memory database. This allows one to set the style name and also change the name any time without affecting already inserted rows, whether the row is rendered or not.

Figure 7:
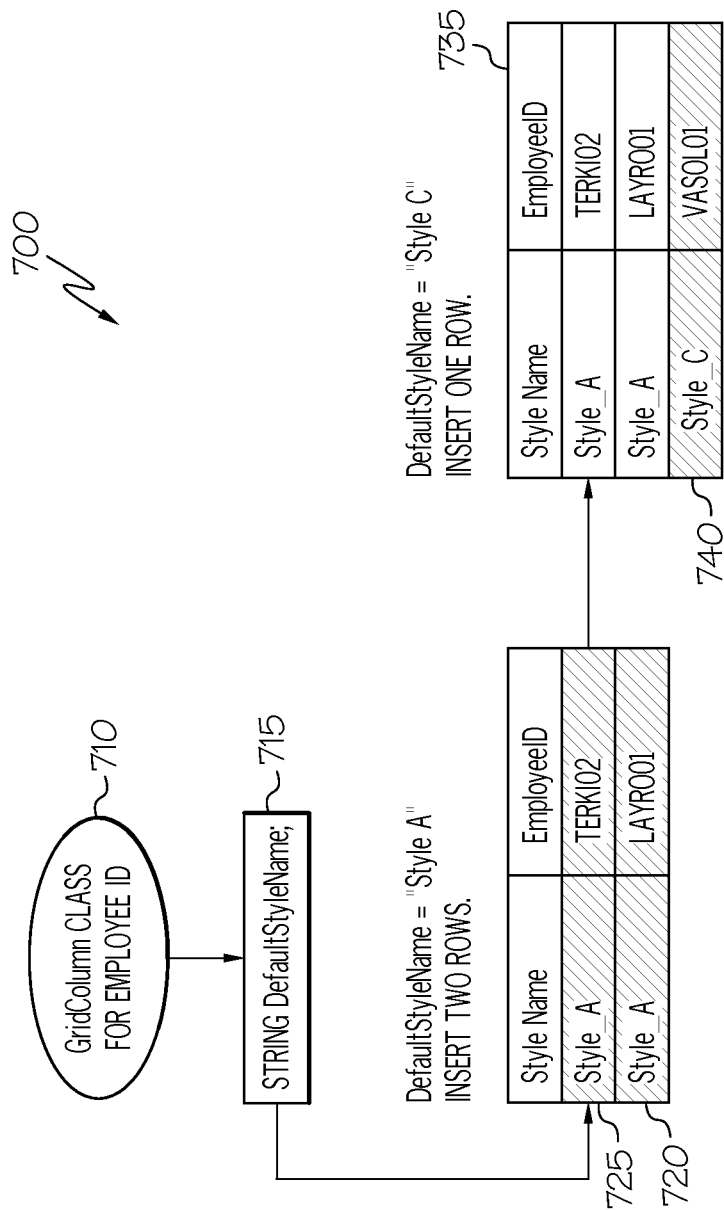
FIG. 7 is a block flow diagram illustrating the use of modifiable default styles when adding rows according to an example embodiment.

FIG. 7 illustrates at 700 a method of inserting a new row. A grid column class for employee ID is shown at 710. A new property indicated at 715 for the grid column class holds a default style name for the new row, "String DefaultStyleName". In this example, the default style name, "Style_A" will be used when inserting a new row. The default style or the style of the specific row can be changed at a later time. The default style is first used to insert two rows in a data grid as indicated at 725, 720. At data grid 735, a new row is added with a different default style 740 or a style that was changed from the default style.

Figure 8:
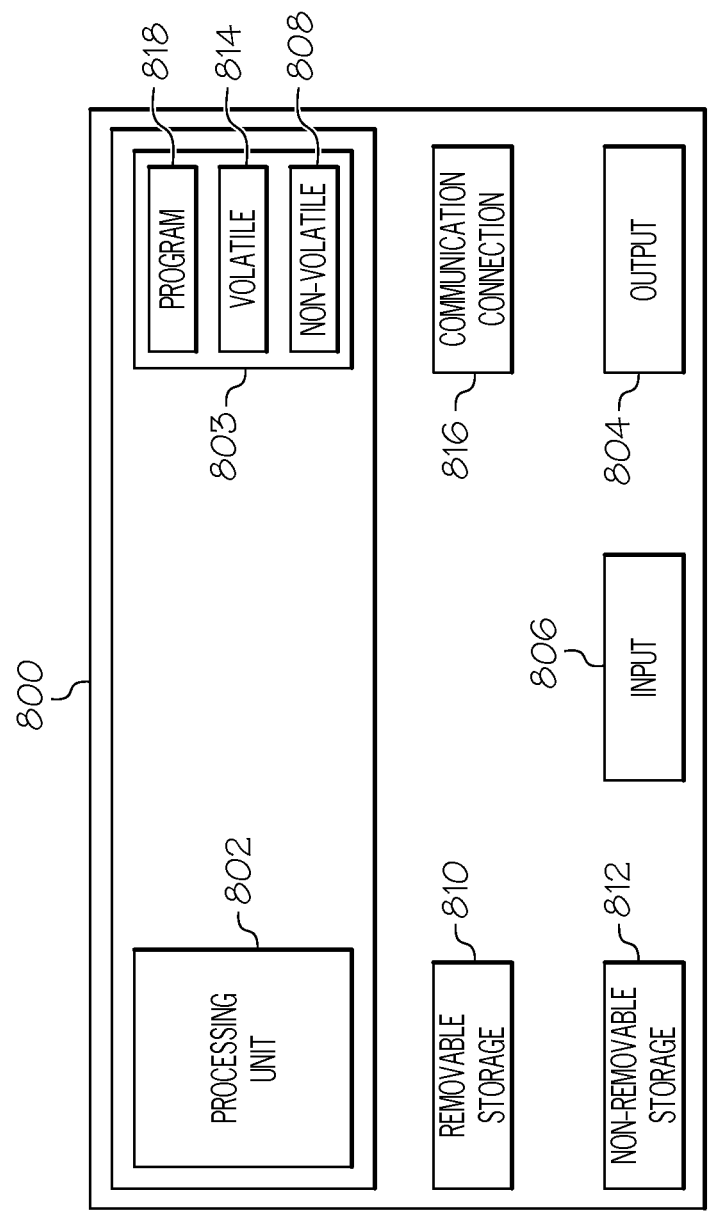
FIG. 8 is a block diagram of an example computer system to implement methods according to example embodiments.

FIG. 8 is a block schematic diagram of a computer system 800 to implement one or more methods according to example embodiments. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer system 800 may include a processing unit 802, memory 803, removable storage 810, and non-removable storage 812. Memory 803 may include volatile memory 814 and non-volatile memory 808. Computer system 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer system 800 may include or have access to a computing environment that includes input 806, output 804, and a communication connection 816. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer system 800. A hard drive, CD-ROM, and RAM are some examples of articles including a non-transitory computer-readable medium. For example, a computer program 818 capable of providing a generic technique to perform access control check for data access and/or for doing an operation on one of the servers in a component object model (COM) based system may be included on a CD-ROM and loaded from the CD-ROM to a hard drive.

The computer-readable instructions allow computer system 800 to provide generic access controls in a COM based computer network system having multiple users and servers.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for modifying data grid cell display properties, said method comprising:
    inserting multiple data entries from a column in a data grid into a data column of a data structure that is logically associated with and structurally distinct from the data grid;
    defining at least one style column in the data structure to include multiple style column entries that each uniquely corresponds to a single one of the data entries, wherein each of the style column entries comprises a style object that specifies a display style for a corresponding one of the data entries; and
    logically binding each of the style objects with a style control for the column of the data grid and that is rendered in the data grid, wherein said logically binding applies the display styles specified by the style objects to one or more cells within the data grid.

2. The method of claim 1, further comprising:
    defining a style name column within the data structure to include multiple style name entries that each correspond to a single one of the data entries, wherein each of the style name entries comprises a style name object;
    modifying at least one of the style objects by converting the style name entries to at least one of the style objects; and
    utilizing the style control to modify an appearance of the data grid based on the modified at least one style object.

3. The method of claim 1, wherein said defining at least one style column in the data structure comprises:
    generating a column containing style objects for an edit mode style; and
    generating a column containing style objects for a display mode style.

4. The method of claim 1, wherein the data column contains display content and the at least one style column comprises a style name column and a style property column.

5. The method of claim 4, wherein the style name column includes entries that each specify a style name and wherein the style property column includes entries that each specify a style property value.

6. The method of claim 5, further comprising utilizing a converter to generate style property values for each of the style names within the style name column.

7. The method of claim 5, further comprising associating style property values within the style property column with display content in the data column.

8. The method of claim 1, further comprising:
    modifying a default style for adding rows to the data structure and the data grid; and
    using the modified default style when adding a new row without modifying the style control.

9. A computer program product comprising a non-transitory computer readable storage medium having instructions stored therein, which when executed by a processor, cause the processor to perform operations comprising:
    inserting multiple data entries from a column in a data grid into a data column of a data structure that is logically associated with and structurally distinct from the data grid;
    defining at least one style column in the data structure to include multiple style column entries that each uniquely corresponds to a single one of the data entries, wherein each of the style column entries comprises a style object that specifies a display style for a corresponding one of the data entries; and
    logically binding each of the style objects with a style control for the column of the data grid and that is rendered in the data grid, wherein said logically binding applies the display styles specified by the style objects to one or more cells within the data grid.

10. The computer program product of claim 9, wherein the instructions further comprise instructions, which when executed by the processor, cause the processor to perform operations comprising:
    defining a style name column within the data structure to include multiple style name entries that each correspond to a single one of the data entries, wherein each of the style name entries comprises a style name object;
    modifying at least one of the style objects by converting the style name entries to at least one of the style objects; and utilizing the style control to modify an appearance of the data grid based on the modified at least one style object.

11. The computer program product of claim 9, wherein the instructions further comprise instructions, which when executed by the processor, cause the processor to perform operations comprising:
generating a column containing style objects for an edit mode style; and
generating a column containing style objects for a display mode style.

12. The computer program product of claim 9, wherein the data column contains display content and the at least one style column comprises a style name column and a style property column.

13. The computer program product of claim 12, wherein the style name column includes entries that each specify a style name and wherein the style property column includes entries that each specify a style property value.

14. The computer program product of claim 13, wherein the instructions further comprise instructions, which when executed by the processor, cause the processor to perform operations comprising utilizing a converter to generate style property values for each of the style names within the style name column.

15. The computer program product of claim 13, wherein the instructions further comprise instructions, which when executed by the processor, cause the processor to perform operations comprising associating style property values within the style property column with display content in the data column.

16. The computer program product of claim 9, wherein the instructions further comprise instructions, which when executed by the processor, cause the processor to perform operations comprising:
modifying a default style for adding rows to the data structure and the data grid; and
utilizing the modified default style when adding a new row without modifying the style control.

17. A system for modifying data grid cell display properties, said system comprising:
a processor; and
a machine readable storage medium having program code stored therein that is executable by the processor to cause the processor to,
insert multiple data entries from a column in a data grid into a data column of a data structure that is logically associated with and structurally distinct from the data grid;
define at least one style column in the data structure to include multiple style column entries that each uniquely corresponds to a single one of the data entries, wherein each of the style column entries comprises a style object that specifies a display style for a corresponding one of the data entries; and
logically bind each of the style objects with a style control for the column of the data grid and that is rendered in the data grid, wherein said logically bind applies the display styles specified by the style objects to one or more cells within the data grid.

18. The system of claim 17, wherein the program code further comprises program code that is executable by the processor to cause the processor to:
define a style name column within the data structure to include multiple style name entries that each correspond to a single one of the data entries, wherein each of the style name entries comprises a style name object;
modify at least one of the style objects by converting the style name entries to at least one of the style objects; and
utilize the style control to modify an appearance of the data grid based on the modified at least one style object.

19. The system of claim 17, wherein the program code further comprises program code that is executable by the processor to cause the processor to:
generate a column containing style objects for an edit mode style; and
generate a column containing style objects for a display mode style.

20. The system of claim 17, wherein the data column contains display content and the at least one style column comprises a style name column and a style property column.

21. The system of claim 20, wherein the style name column includes entries that each specify a style name and wherein the style property column includes entries that each specify a style property value.

22. The system of claim 21, wherein the program code further comprises program code that is executable by the processor to cause the processor to utilize a converter to generate style property values for each of the style names within the style name column.

23. The system of claim 21, wherein the program code further comprises program code that is executable by the processor to cause the processor to associate style property values within the style property column with display content in the data column.

24. The system of claim 17, wherein the program code further comprises program code that is executable by the processor to cause the processor to:
modify a default style for adding rows to the data structure and the data grid; and
utilize the modified default style when adding a new row without modifying the style control.

* * * * *